United States Patent
Brown (10) Patent No.: US 11,546,281 B1
(45) Date of Patent: Jan. 3, 2023

(54) DISPLAYING AND PRIORITIZING ELECTRONIC COMMUNICATIONS BASED ON MESSAGE CONTENT

(71) Applicant: ALLSCRIPTS SOFTWARE, LLC, Chicago, IL (US)

(72) Inventor: Joshua Brown, Fuquay Varina, NC (US)

(73) Assignee: ALLSCRIPTS SOFTWARE, LLC, Chicago, IL (US)

( * ) Notice: Subject to any disclaimer, the term of this patent is extended or adjusted under 35 U.S.C. 154(b) by 0 days.

(21) Appl. No.: 16/235,019

(22) Filed: Dec. 28, 2018

(51) Int. Cl.
*H04L 51/18* (2022.01)
*G06F 3/0484* (2022.01)
*G06F 3/0482* (2013.01)
*G06F 40/295* (2020.01)
*H04L 51/216* (2022.01)

(52) U.S. Cl.
CPC ............ *H04L 51/18* (2013.01); *G06F 3/0482* (2013.01); *G06F 3/0484* (2013.01); *G06F 40/295* (2020.01); *H04L 51/216* (2022.05)

(58) Field of Classification Search
CPC ....... H04L 51/18; H04L 51/16; G06F 40/295; G06F 3/0482; G06F 3/0484
See application file for complete search history.

(56) References Cited

U.S. PATENT DOCUMENTS

| | | | |
|---|---|---|---|
| 2006/0143613 A1* | 6/2006 | Lippe | G06Q 10/06 718/100 |
| 2011/0154338 A1* | 6/2011 | Ramanathaiah | G06Q 10/06 718/100 |
| 2015/0205782 A1* | 7/2015 | Subramanya | G06F 40/174 704/9 |
| 2016/0063452 A1* | 3/2016 | Harris | G06Q 10/063114 705/7.15 |
| 2016/0269336 A1* | 9/2016 | Blinder | H04L 51/22 |
| 2016/0357718 A1* | 12/2016 | Gelfand | G06F 40/154 |
| 2017/0344931 A1* | 11/2017 | Shenk | G06F 3/0481 |
| 2018/0004731 A1* | 1/2018 | Brunn | G06F 17/2809 |
| 2018/0129993 A1* | 5/2018 | Fowler | G06Q 10/06312 |
| 2019/0236515 A1* | 8/2019 | Murdock | G06Q 10/00 |

FOREIGN PATENT DOCUMENTS

EP  1918825 A1 * 5/2008 ........... G06Q 10/107

* cited by examiner

*Primary Examiner* — Chris Parry
*Assistant Examiner* — Abderrahmen Chouat
(74) *Attorney, Agent, or Firm* — Loza & Loza, LLP; Peter Zura (57) ABSTRACT

Electronic messages, such as emails, often ask questions, ask that a task be done, or assign a task. The responsive messages often forget to answer the questions and the responders often forget to calendar tasks. Advances in natural language processing provide computers the ability to notice the questions and task requests/assignments. Automated analysis of the messages can detect and highlight questions, can provide for draft responses addressing every question, and can provide for getting tasks calendared.

16 Claims, 10 Drawing Sheets

DISPLAYING AND PRIORITIZING ELECTRONIC COMMUNICATIONS BASED ON MESSAGE CONTENT

TECHNICAL FIELD

Embodiments relate to electronic messaging, natural language processing, message processing, and computer interfaces. More specifically, the embodiments relate to improvements in systems and methods that present and process electronic messages for humans.

BACKGROUND

People often receive email or electronic messages asking questions or requesting performance of tasks. For succinctness, the term "message" is used herein for emails, text messages, and other forms of electronic message sent to a person. Many messages ask simple questions that the recipient can answer. Meanwhile, the message sender is often waiting for a response before proceeding with their own task or project. The message can sit amongst a plethora of received messages with no indication that the particular message may be more important than other messages. Ideally, the recipient will eventually respond to the message. Even then, questions can go unanswered and task requests can go unanswered.

The current user interfaces and underlying technology are not well suited for surfacing high priority messages in a manner that brings the message to the recipient's attention. Nor are the interfaces and technology capable of helping the recipient provide detailed and high-quality responses. System and methods that help a message recipient focus on important messages and to answer those messages fully are required.

Natural Language Processing (NLP) is a technology whereby computers attempt to determine the meaning of a human's communication. Virtual assistants (e.g. Amazon Alexa, Google Home, etc.) record a person's speech and use NLP to attempt responding to the person's intent. Users of such virtual assistants are well aware of the device's shortcomings and the rapid pace at which the devices are improving.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is therefore an aspect of the embodiments to receive a message intended for a person. The message is an electronic message that can be automatically processed by a computer to segment one or more questions or to segment one or more requests from the body of the message. A request, as used here, can be a question or a task request. A question is a request for an answer. A task request is a request that an activity be performed. A number of requests can include one or more questions and one or more task requests.

Segmentation is one of the steps in a typical natural language processing (NLP) pipeline. NLP algorithms and pipelines are available as services and as software libraries. An NLP pipeline can be viewed as a series of NLP algorithms with each algorithm performing a particular analysis and generating an output that may be used by the next algorithm in the pipeline. "Amazon Comprehend" and "Google Cloud Natural Language" are two of the currently available NLP pipelines offered as a service. Current NLP libraries include "spaCy," "textacy," and "neuralcoref."

It is a further aspect of the embodiments that performing entity recognition identifies those requests and questions that are directed to the person. As with segmentation, entity recognition is an aspect of NLP pipelines. Here, the entity recognition step can use data from the message header for determining who is being asked a question or who is requested to do something. For example, a question directed Robert can ask "Do you know the number of hectares in a parsec?" in which case "you" can be resolved to Robert. Similarly, a message directed to a group of people can resolve "Bob" as Robert such that Robert's message list shows a pending question while other people's message lists do not show that particular question as pending for the other people.

It is an additional aspect of the embodiments to show how many questions or requests are directed to the person. Here, "request" is intended to include requests for something to be done such as "Bob, buy eggs" as well as requests for information (questions) such as "Bob, how many eggs are in the refrigerator?"

A messaging client with a graphical user interface (GUI) is the principal means by which a person performs messaging tasks. For example, an email client, either stand alone or presented in a browser window, can show a person messages that are new, have been read, have been answered, have been sent, etc. Most people in the developed world are familiar with email clients and the various grouping and displays of images within an email client. Other messaging platforms can have GUIs functionally similar to email clients or otherwise presenting lists or groupings of incoming messages, sent messages, answered messages, etc.

It is a yet further aspect of the embodiments that a messaging client displays the number of questions or requests in a message in association with the message. For example, a messaging client can show a list of messages available for reading. For example, email clients often display a table of messages, one message per row. One column can display the message sender while another column displays the email's subject line. The number of questions/requests can be presented in another column, as additional information in an existing column, as an indicator superimposed on the row, or as an indicator that in manner indicates to the user that the message contains questions/requests and how many questions/requests. Note that a table having a column used to display the count of questions/requests can often be sorted based on the question/request count. As such, a person can cause the GUI to show messages needing responses at the top of the table.

It is a still yet further aspect of the embodiments that the message can be modified to make questions and requests more visually distinctive. For example, many email messages contain formatting to display sections of text in a particular font, in bold, in italics, by highlighting, by underlining, in a specific color, larger then the surrounding text, etc. After segmentation and entity recognition, a question in the message body can be bolded, underlined, etc. if it is directed to the person reading the message.

Having received a message with requests/questions, a person can write and send a response to the message. A draft response can be automatically generated for the person if the person desires to write a response to the message using such a draft. For example, a person's desire for an automatically generated draft can be detected as a setting in the messaging client or as a GUI input (checkbox, clickable button, etc.). The draft can include a list of questions or requests assigned to the person. For example, if the NLP pipeline detected five questions directed to the person then those five questions can put in a list in the body of the draft response.

The response to the message can include answers to the questions. The message sender often prefers that every question be answered. The person responding often hopes that all the questions are answered. The response can be analyzed to determine if all the questions are answered. As discussed above, the questions in the message can be automatically located and listed. Similarly, the response can be analyzed to determine if a question is unanswered. For example, the draft message discussed above can be automatically generated. The person writing the response can edit the draft to answer each question. Unanswered questions can be detected by comparing the draft to the edited response to determine if text has been added after each listed question. If an unanswered question is detected, the person can be provided an opportunity to answer it. For example, the person can click the GUI's "send" button, thereby triggering analysis of the response. On detecting one or more unanswered question, a warning message showing the unanswered question(s) can be displayed to the user and offering a choice to "send anyway" or "continue editing." "Continue editing" is an opportunity for the user to change the response instead of sending an incomplete response. "Send anyway" is an option to send the response even though the analysis indicates the response is incomplete.

When a person sends a response such as an incomplete response, the person may wish to have a reminder that that task of answering the question or some other task needs to be performed. The person can be provided with an option to add the task to a to-do list. Returning to the previous example, the person can click a button to "send anyway." A checkbox next to the "send anyway" button can provide the person an option to add answering the question to a to-do list. Another option is for a window to pop up and ask the user if answering the question should be added to a to-do list. If the person so chooses, the task is automatically added to the person's to-do list.

Task tracking software is used by professionals to manage to-do lists and that software often has application program interfaces (APIs) for interacting with the to-do lists. The task of answering a question can be added to a to-do list by invoking the API. Some APIs can be invoked by sending a message to a server. Those practiced in cloud computing, software as a service, and distributed applications are familiar with sending messages to servers to thereby invoke an API.

Having determined that a message includes a request for a task to be performed by the person, the person can be provided with an option to have the task submitted to a task tracking application such as the task tracking software discussed above. For example, a GUI dialog can contain a GUI button configured to send a message to an API thereby causing the task to be added to a to-do list.

An alternative embodiment can modify the message by adding a list of requests. The NLP pipeline having identified requests directed to the person, a list of the requests can be produced directly in the message body. For example, a message sender can send an email having various requests in different parts of the message body. The requests can be identified. A request list can be generated by putting the identified requests into a list. The request list can be added to the start of the email before it is read by the person. In this manner, a person reading the request list knows what requests the message sender has made. Furthermore, requests in the list can be selectable, such as a GUI button or a hyperlink. The GUI can detect selection of a selectable item such as a button, checkbox, or selectable item on a list. Selecting a request on the list can cause the task request to be submitted to a task tracking application for addition to a to-do list.

As discussed above, a list of the questions to be answered by the person can be added to a message. The questions in the list can be selectable such that selecting a question results in submitting the question to a search engine. For example, selecting the question can cause a browser window to be opened and to send the question to a search engine. The search results would then be displayed in the browser window.

An alternative to adding a list of requests to the message itself is to provide a selectable element in the GUI that, when selected, causes the request list to be displayed. This alternative can present the request list to the person when the message itself is not modified. The selectable element can be a GUI button. For example, a selectable indicator can be a selectable GUI element showing the number of requests in a message and the list of requests can appear in a pop-up dialog when the GUI element is selected.

It is still yet another aspect of the embodiments that a person's response to a message contains a message history that includes the message being responded to. The message, being available in the response, can be analyzed as discussed above to identify questions directed to the person. The questions having been identified, the response can be analyzed to determine if any of the questions is unanswered. If there is an unanswered question, the person can be given an opportunity for modifying the response. The unanswered question can be shown to the person when the opportunity is provided. The person can be provided with options for modifying the response, to add the unanswered question to a to-do list, to send the response as is, etc.

Just as a response's message history can be analyzed to identify questions, it can be analyzed to identify tasks to be performed by the person. The response can be analyzed to determine that the person has indicated that a task has been done or has yet to be done. If a task is to be done, the person can be provided with an option to add the task to a to-do list.

These and other features and advantages of the disclosed embodiments will be presented in more detail in the following specification and the accompanying figures, which illustrate by way of example the principles of the disclosed embodiments.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION

The particular values and configurations discussed in the following non-limiting examples can be varied and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, system, or instantiation of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements, or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

All of the systems and/or methods disclosed and claimed herein can be made and executed without undue experimentation in light of the present disclosure. While the compositions and methods of this invention have been described in terms of preferred embodiments, it will be apparent to those skilled in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Figure 1:
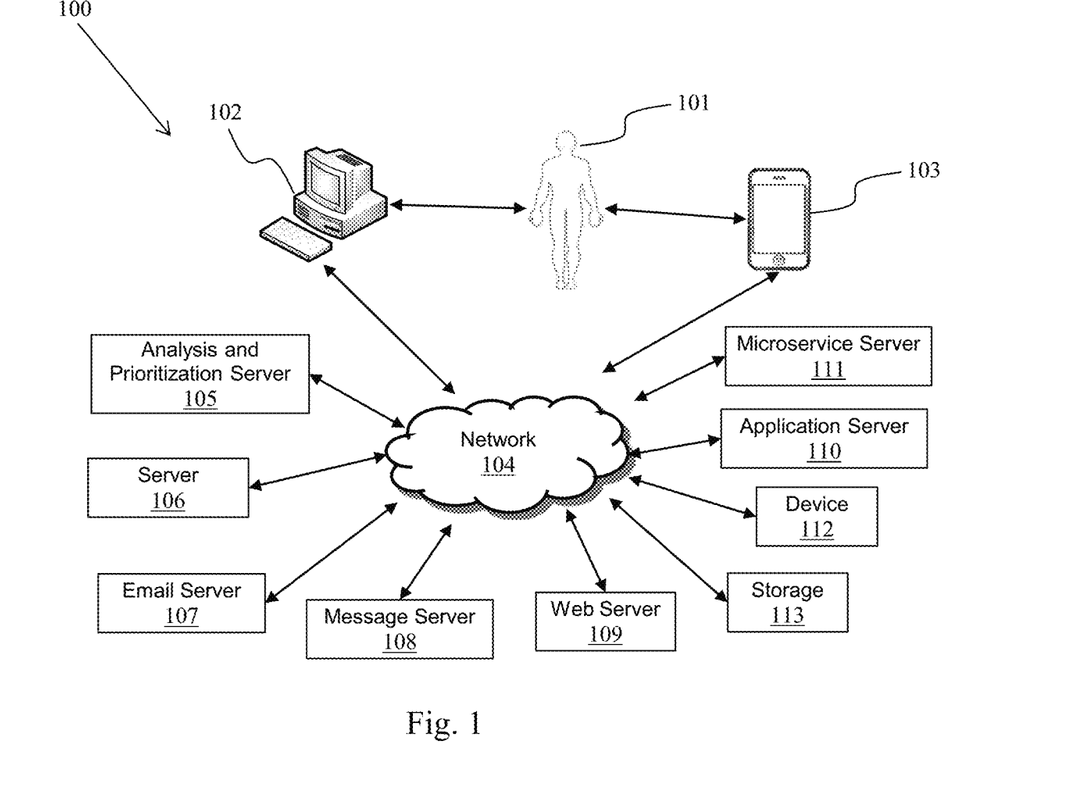
FIG. 1 illustrates a computing environment with a person receiving messages in accordance with aspects of the embodiments.
Figure 2:
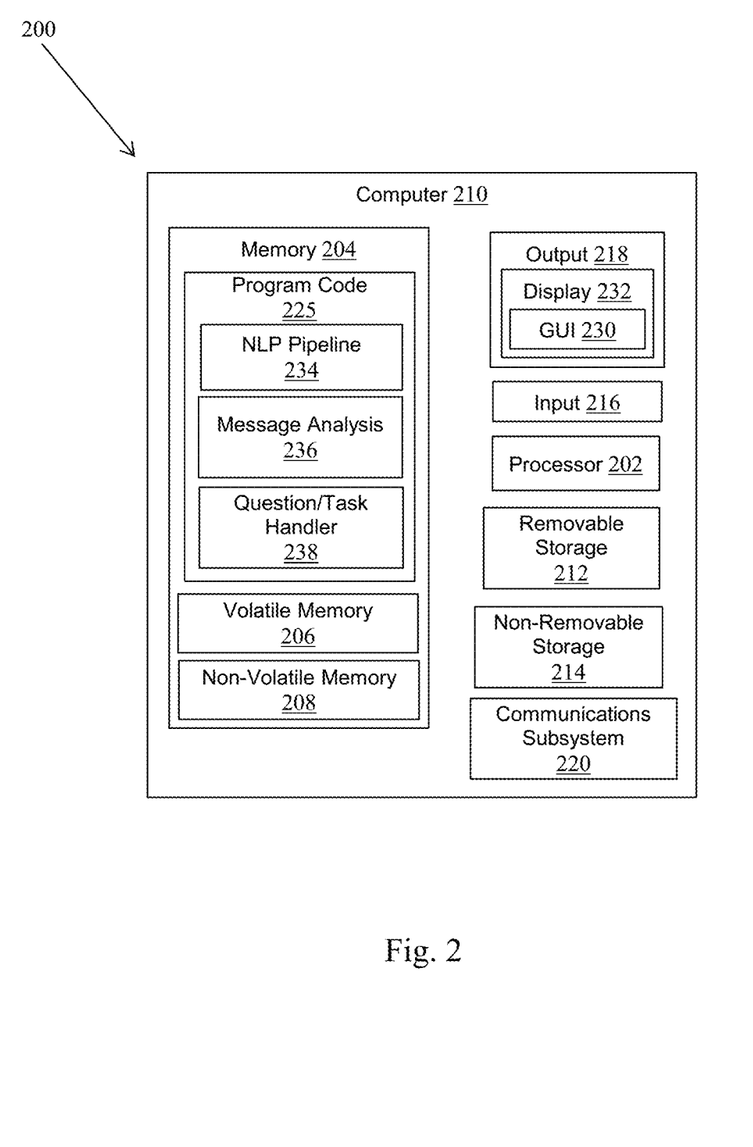
FIG. 2 depicts a block diagram of a computer system which is implemented in accordance with the disclosed embodiments.
Figure 3:
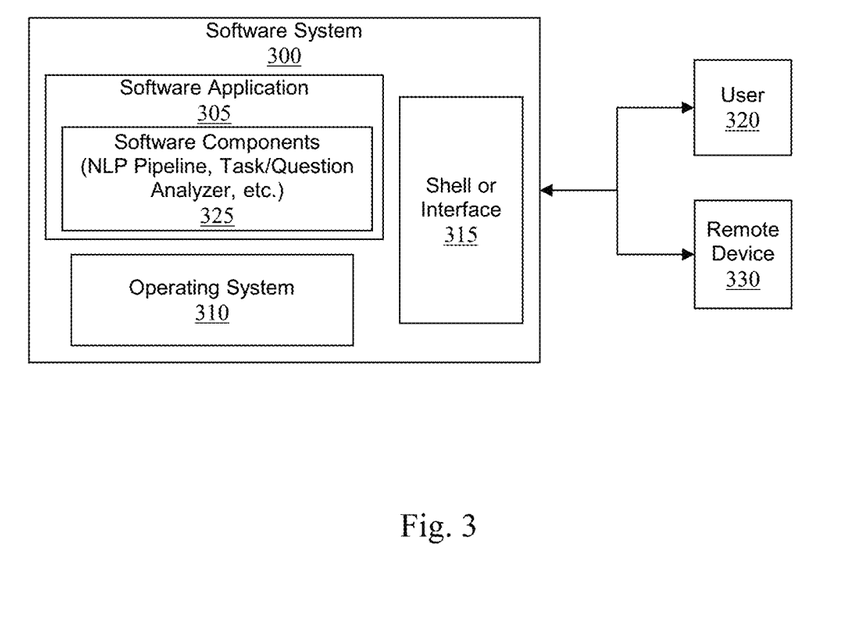
FIG. 3 depicts a computer software system for directing the operation of the data-processing system depicted in FIG. 2 in accordance with an example embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

FIG. 1 depicts a graphical representation of a network of data-processing systems 100 in which aspects of the present invention may be implemented. Network data-processing system 100 can be a network of computers or other such devices, such as mobile phones, smartphones, sensors, controllers, speakers, tactile devices, and the like, in which embodiments of the present invention may be implemented. Note that the system 100 can be implemented in the context of a software code such as program code 203. The system 100 includes a network 104 in communication with one or more client devices such as desktop computer 102 and smart phone 103. Network 104 may also be in communication with one or more devices 112, servers 105-111, and storage 113. Network 104 is a medium that can be used to provide communications links between various devices and computers connected together within a networked data processing system such as computer system 200. Network 104 may include connections such as wired communication links, wireless communication links of various types, and fiber optic cables. Network 104 can communicate with one or more servers 105-111, one or more external devices such as device 112, and a memory storage unit such as, for example, memory or database 113. It should be understood that device 112 may be embodied as networked equipment such as a robot, printer, scanner, or other device that measures or manipulates physical objects.

In the depicted example, device 112, servers 105-111, and client devices 102, 103 connect to network 104 along with storage unit 112. Client devices, may be, for example, personal computers or network computers, handheld devices, mobile devices, tablet devices, smartphones, personal digital assistants, printing devices, recording devices, speakers, MFDs (printer/scanner/fax combinations device), etc. Computer system 200 depicted in FIG. 2 can be, for example, a client such as desktop computer 102 and/or smart phone 103 and/or other client device.

Computer system 200 can also be implemented as a server such as servers 105-111, exemplified by server 106, depending upon design considerations. In the depicted example, server 106 provides data such as boot files, operating system images, applications, and application updates to client devices 102, 103. Client devices 102, 103 and device 112 are clients to servers 105-111 in this example. Network data-processing system 100 may include additional servers, clients, and other devices not shown. Specifically, clients may connect to any member of a network of servers, which provide equivalent content. A networked computer or device 102-113 can provide a network accessible webhook or API (Application Program Interface) such that other machines can use the webhooks or APIs to remotely execute program code.

In the depicted example, network data-processing system 100 is the Internet, with network 104 representing a worldwide collection of networks and gateways that use standardized protocols, such as the Transmission Control Protocol/Internet Protocol (TCP/IP), to communicate with one another. At the heart of the internet is a backbone of high-speed data communication lines between major communications nodes, bridges, routers, and computers consisting of thousands of commercial, government, educational, and other computer systems that route data and messages. Of course, network data-processing system 100 may also be implemented as a number of different types of networks such as, for example, an intranet, a local area network (LAN), or a wide area network (WAN). FIGS. 1-3 are intended as examples and not as architectural limitations for different embodiments of the present invention.

A block diagram of a computer system 200 that executes programming for implementing parts of the methods and systems disclosed herein is shown in FIG. 2. A computing device in the form of a computer 210 configured to interface with controllers, peripheral devices, and other elements disclosed herein may include one or more processing units 202, memory 204, removable storage 212, and non-removable storage 214. Memory 204 may include volatile memory 206 and non-volatile memory 208. Computer 210 may include or have access to a computing environment that includes a variety of transitory and non-transitory computer-readable media such as volatile memory 206 and non-volatile memory 208, removable storage 212 and non-removable storage 214. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 210 may include, or have access to, a computing environment that includes input 216, output 218, and a communications subsystem 220. The computer may operate in a networked environment using a communications subsystem 220 to connect to one or more remote computers, remote sensors and/or controllers, detection devices, handheld devices, multi-function devices (MFDs), speakers, mobile devices, tablet devices, mobile phones, Smartphone, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 1.

FIG. 1 illustrates a person 101 receiving messages in accordance with aspects of the embodiments. The person 101 can interact with a client device such as a desktop computer 102 or smart phone 103 to access electronic messages presented by a messaging client such as an email client. The desktop computer 102 and smart phone 103 are connected to a communications network 104, and can therefore communicate with a variety of servers 105-111. Those servers can include a microservice server 111, an application server 110, a web server 109, a message server 108, and email server 107, an analysis and prioritization server 105, or another server 106.

A messaging client can run on a client device such as the desktop computer 102 and access a messaging server 108. An email client, which is a specific type of messaging client, can run on a client device such as smart phone 103 and can access email server 107. Alternatively, the messaging client can run on a server and provide a GUI displayable within a web browser. A client device can run the web browser that accesses a web server 109 to thereby provide the messaging client GUI to the user.

The analysis and prioritization server 105 can interact with a messaging client, email server 107, messaging server, etc. to process messages intended for the person 101. This processing provides an advance in computer function by analyzing the messages to extract information that is useful to the user by providing information indicating that the message is requesting answers to questions, performance of tasks, etc. A further improvement is that the analysis and prioritization server 105 can analyze responses to messages to determine if the questions are unanswered or tasking unconfirmed. In this manner, automated processes augment current messaging systems by helping people respond fully to messages.

Output 218 is most commonly provided as a computer monitor, but may include any output device. Output 218 and/or input 216 may include a data collection apparatus associated with computer system 200. In addition, input 216, which commonly includes a computer keyboard and/or pointing device such as a computer mouse, computer track pad, or the like, allows a user to select and instruct computer system 200. A user interface can be provided using output 218 and input 216. Output 218 may include a display 232 for displaying data and information for a user, or for interactively displaying a GUI (graphical user interface) 230. A GUI is typically responsive of user inputs entered through input 216 and typically displays images and data on display 232.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 216 such as, for example, a pointing device such as a mouse, and/or with a keyboard. A particular item can function in the same manner to the user in all applications because the GUI provides standard software routines (e.g., program code 225 can include such software routines) to handle these elements and report the user's actions. The GUI can further be used to display the electronic service image frames as discussed below.

Computer-readable instructions, for example, program code 225, which can include or be representative of software routines, software subroutines, software objects, nodes, etc. described herein, are stored on a computer-readable medium and are executable by the processing unit 202 of computer 210. Program code 225 may include a computer application. A hard drive, CD-ROM, RAM, Flash Memory, and a USB drive are just some examples of articles including a computer-readable medium. The program code of FIG. 2 is illustrated as including a natural language processing (NLP) pipeline 234, message analysis code 236 and a question/task handler 238.

An NLP pipeline 234 can analyze a message and provide output that indicates what parts of the message are questions, the entities involved, and other information about the message, sentences in the message, and possible relationships between the words and phrases within the message. Those having knowledge of NLP pipelines, services, or libraries are familiar with the outputs of NLP pipelines and algorithms. Message analysis 236 can augment an NLP pipeline by identifying, based on the language structures located earlier in the pipeline, certain message segments as questions and others as requests to perform a task. Note that there is no need to understand the question or task, only that the NLP pipeline has located constructs that are likely to be questions or task requests based on sentence structure, base verbs, verb tense, etc. The NLP named entity recognition step produces output indicating if the person receiving the message is being tasked or asked a question. Message analysis 236 can be part of an NLP pipeline or can receive the output of an NLP pipeline. For example, a message can be submitted to one of the NLP pipeline as a service offerings and the pipeline output submitted to a message analyzer based on one of the NLP libraries.

The questions/tasks having been identified, a question/task handler 238 can interact with the messaging client to inform the person of the questions and tasks. For example, an email client's API or GUI can be caused to display the number of questions/requests or the message can be modified by adding lists of questions/requests.

FIG. 3 illustrates a software system 300, which may be employed for directing the operation of the data-processing systems such as computer system 200 depicted in FIG. 2. Software application 305, may be stored in memory 204, on removable storage 212, or on non-removable storage 214 shown in FIG. 2, and generally includes and/or is associated with a kernel or operating system 310 and a shell or interface 315. One or more application programs may be "loaded" (i.e., transferred from removable storage 212 or non-removable storage 214 into the memory 204) for execution by the data-processing system 200. The application program 305 can include software components 325 such as software modules, software subroutines, and software objects 325. The data-processing system 200 can receive user commands and data through interface 315, which can include input 216, output 218, and communications connections 220 accessible by a user 320 or remote device 330. These inputs may then be acted upon by the computer system 200 in accordance with instructions from operating system 310 and/or software application 305 and any software components 325 thereof.

Generally, software components 325 can include, but are not limited to, routines, subroutines, software applications, programs, objects, modules, objects (used in object-oriented programs), executable instructions, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smartphones, tablet devices, multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the terms "component," "module," or "node" as utilized herein may refer to one of or a collection of routines and data structures that perform a particular task or implements a particular abstract data type. Applications and components may be composed of two parts: an interface, which lists the constants, data types, variables, and routines that can be accessed by other modules or routines; and an implementation, which is typically private (accessible only to within the application or component) and which includes source code that actually implements the routines in the application or component. The terms application or component may also simply refer to an application such as a computer program designed to assist in the performance of a specific task such as word processing, accounting, inventory management. Components can be built or realized as special purpose hardware components designed to equivalently assist in the performance of a task.

The interface 315 can include a graphical user interface 230 that can display results, whereupon a user 320 or remote device 330 may supply additional inputs or terminate a particular session. In some embodiments, operating system 310 and GUI 230 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to operating system 310 and interface 315. The software application 305 can include, for example, software components 325, which can include instructions for carrying out steps or logical operations such as those shown and described herein.

The description herein is presented with respect to embodiments that can be embodied in the context of, or require the use of, a data-processing system such as computer system 200, in conjunction with program code 225, software system 300, or data-processing system 100 and network 104 depicted in FIGS. 1-3. The disclosed embodiments, however, are not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, and the like. Therefore, the descriptions of the exemplary embodiments, which follow, are for purposes of illustration and not considered a limitation.

Computer systems 200 and software systems can take the form of or run as virtual machines (VMs) or containers that run on physical machines. A VM or container typically supplies an operating environment, appearing to be an operating system, to program code 225 and software applications 325 running in the VM or container. A single physical computer can run a collection of VMs and containers. In fact, the entire network data processing system 100 (but likely excluding device 112) with client devices 102-103, servers 105-111, storage 113, and network 104 can be virtualized and running within a single computer (or a few computers) running VMs or containers. Those practiced in cloud computing are practiced in the use of VMs, containers, virtualized networks, and related technologies.

Figure 4:
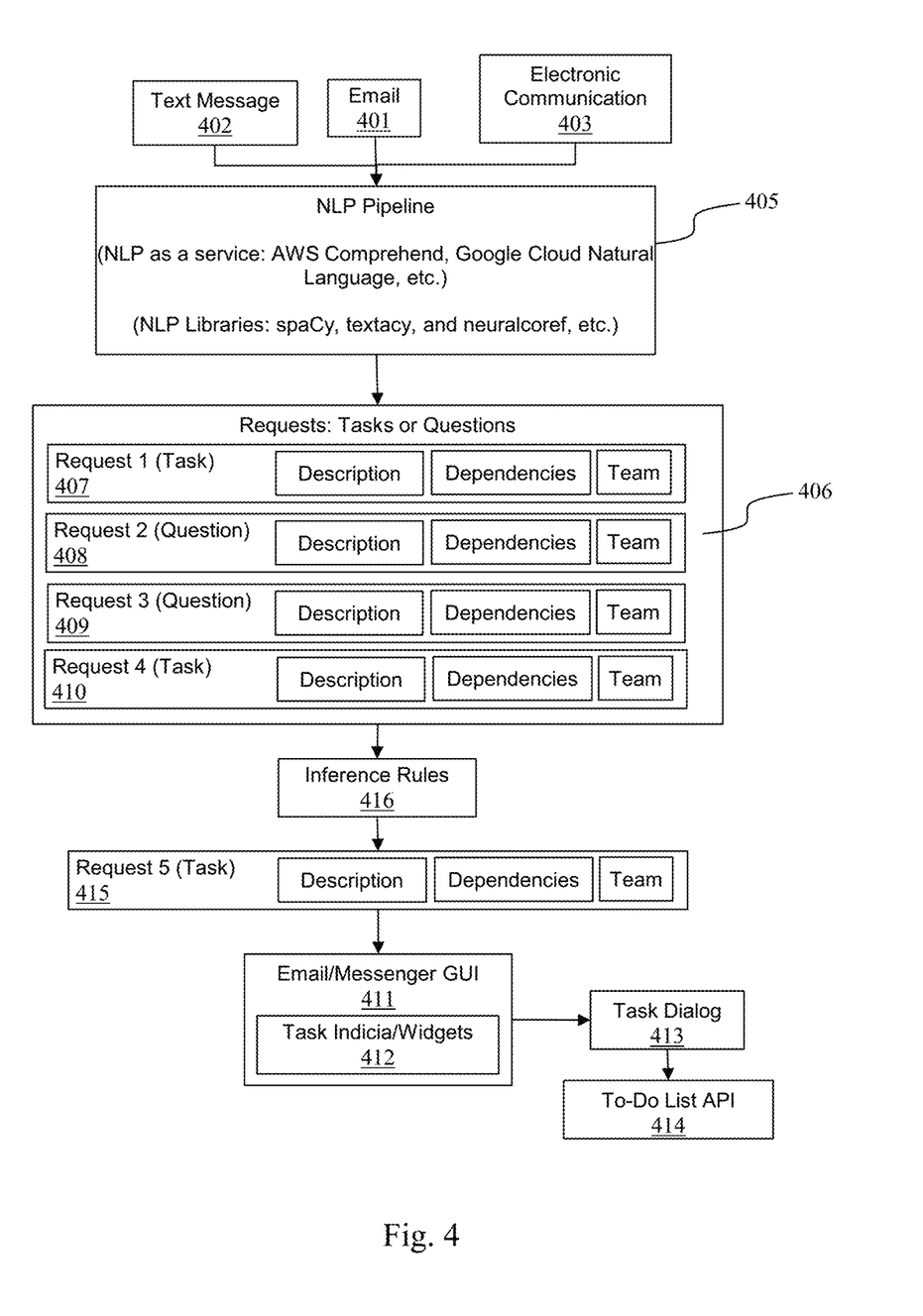
FIG. 4 illustrates a high level block diagram of electronic messages being analyzed in accordance with aspects of the embodiments.

FIG. 4 illustrates a high level block diagram of electronic messages 401-403 being analyzed in accordance with aspects of the embodiments. Email 401, text messages 402, and other electronic communications 403 are examples of electronic messages. Electronic messages can be submitted to an NLP pipeline 405. An NLP pipeline can be viewed as a series of NLP algorithms with each algorithm performing a particular analysis and generating an output that may be used by the next algorithm in the pipeline. "Amazon Comprehend" and "Google Cloud Natural Language" are two of the currently available NLP pipelines offered as a service. Current NLP libraries include "spaCy," "textacy," and "neuralcoref." The NLP pipeline output can be a group of requests 406 that are tasks or questions. Each request 407-410 can include a description, dependencies, and team. The description can be the NLP identified segment, copied directly from the message, containing the request. The verbs, sentence structure, and punctuation of the segment can indicate it the request is a task or a question. The team, identified using the NLP named entity recognizer, generally includes the person receiving the message.

Inference rules 416 can infer a task based on a question. For example, "Can you buy the eggs?" is a question that implies a request to buy eggs. NLP pipelines can determine that the clause "can you" applies to the task "buy eggs." The inference rules separate the task from the segment and create another request, this time an inferred task. A count of requests, or request count, indicates the number requests directed to the person. A count of questions, or question count, indicates the number of questions directed to the person. A count indicating the number of requests or questions is available for display to the person.

The identified requests can be passed to the email/messenger GUI 411 such that the GUI can display an indicator, such as the number of requests, or widgets 412. Here "widgets" refers to an interactive GUI object such as a checkbox, button, pop-up, dialog, etc. For requests that are tasks, the GUI can display a task dialog 413 that can send a message to a task manager or to do list API 414 to thereby cause the task to be added to a to do list.

Figure 5:
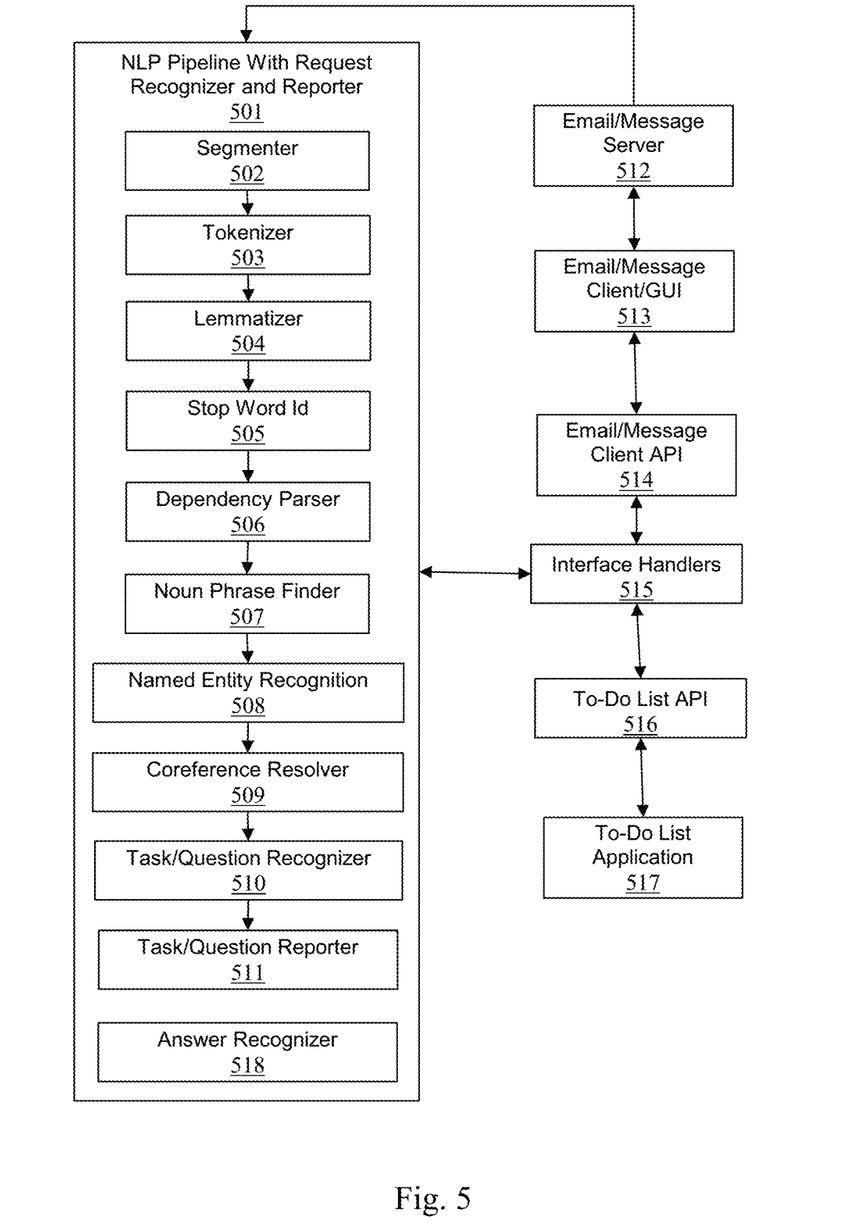
FIG. 5 illustrates a high level block diagram of system components for analyzing message in accordance with aspects of the embodiments.

FIG. 5 illustrates a high level block diagram of system components for analyzing messages in accordance with aspects of the embodiments. An NLP pipeline 501 with a request recognizer 510 and reporter 511 is illustrated as a pipeline having a series of components, each feeding into the next. The NLP pipeline 501 can analyze a message by passing it through the various components.

A segmenter 502 divides a message in segments, usually sentences although some segmenters divide into paragraphs and then sentences. The sentences can then pass to a tokenizer 503. Tokenization splits text into smaller pieces, called tokens, that can be words, numbers, punctuation marks, etc. A lemmatizer 504 identifies a word's base form based on its context. Note that the example uses a lemmatizer instead of a stemmer, which identifies a words linguistic stem without considering context. A stemmer may yield acceptable results and, being simpler than a lemmatizer, produces results more quickly.

A stop word identifier 505 tags the stops words. In general, stop words are very common words that may be filtered out or ignored by later analysis steps. A list of English stop words can include: the, is, at, which, and on. Next, a dependency parser 506 assigns syntactic structures to the sentences. Most current dependency parsers are based on parse trees.

A noun phrase finder 507 finds noun phrases in the sentences. Noun phrases often act as the subjects or objects of verbs, as predicative expressions, and as components of prepositions.

Named entity recognition 508 is an information extraction step that identifies known entities. For example, "U.S." would be recognized as referring to the United States. A refinement for the current embodiments is that pronouns such as "you" can be equated to the message recipient who is a known and named entity. The coreference resolver 509 finds the expressions that refer to the same entity, this analysis step can span multiple sentences.

The task/question recognizer 510 uses the outputs of the previous steps to identify those sentences that are questions directed to the person receiving the message or are tasks to be performed by the person receiving the message. The task/question reporter 511 is responsible for interacting with the interface handlers 515 such that the requests (questions and tasks) are passed to messaging clients 513 or to-do list applications 517, as required. The answer recognizer 518 examines responses to messages, perhaps after passing the response through the NLP pipeline, to determine if the question has been answered or a task addressed. One very simple implementation of this function can analyze a request list added to message to determine if the person has added text to the list.

Different application programs and web services usually have different APIs. The interface handlers 515 are middleware that can format communications to and from the various APIs and thereby adapt the embodiments for interfacing with a wide variety of messaging/email client APIs 514 and to-do list APIs 516. The messaging/email client APIs 514 can control the behavior and display of email/message clients and GUIs 514. The to-do list APIs can control the behavior and display of to-do list applications 517. Email clients 513 can interact with email/message servers 512. Email servers 107, 513 can interact directly with NLP pipelines 501 running on analysis and prioritization servers 105 such that messages are processed before they are accessed by an email client 513. The email server 107, 513 or email client 513 can submit responses to messages to the analysis and prioritization server 105 to verify that all questions are answered and tasks addressed.

Figure 6A:
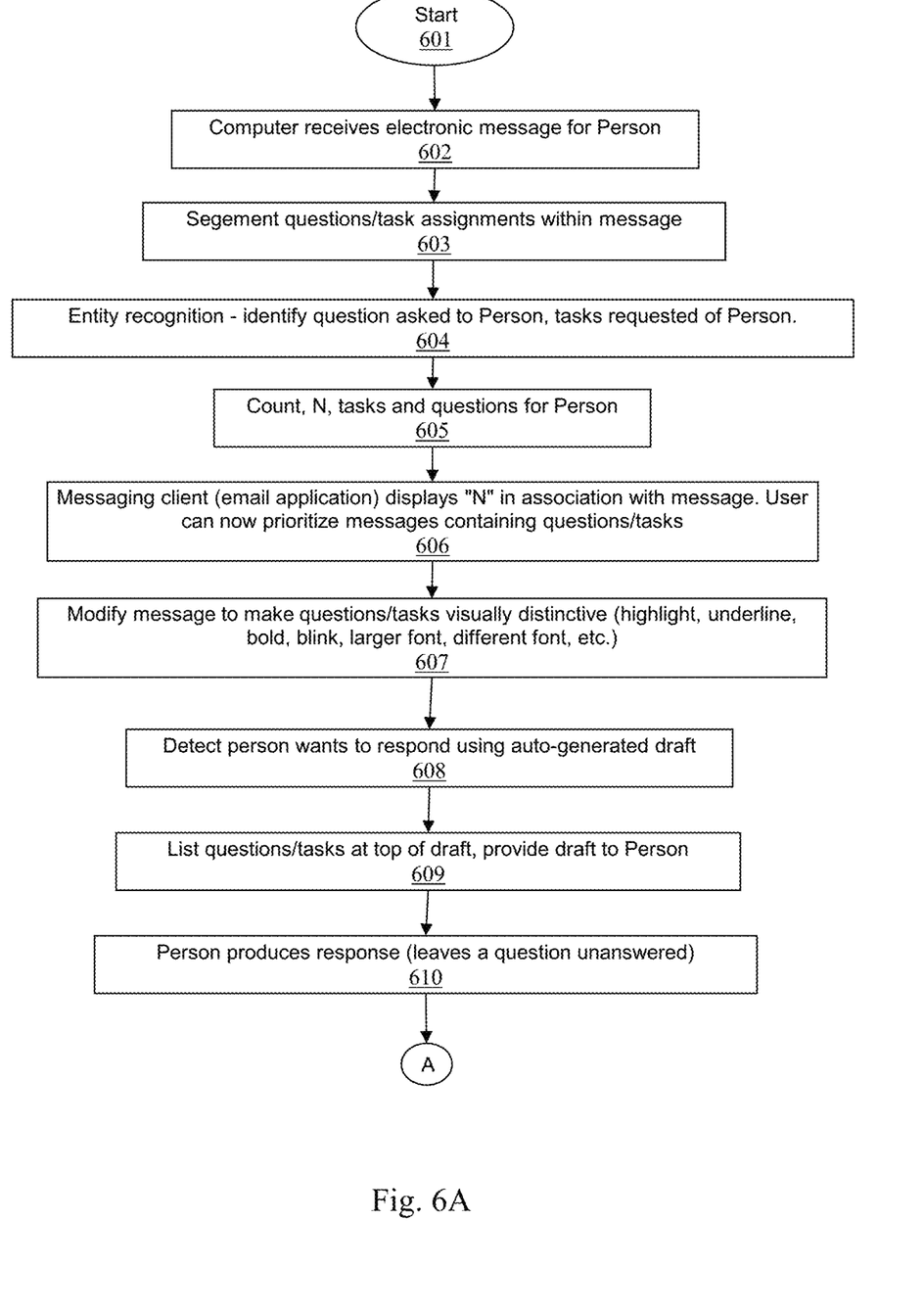
FIGS. 6A and 6B illustrate a high level flow diagram of a message and response being analyzed in accordance with aspects of the embodiments.
Figure 6B:
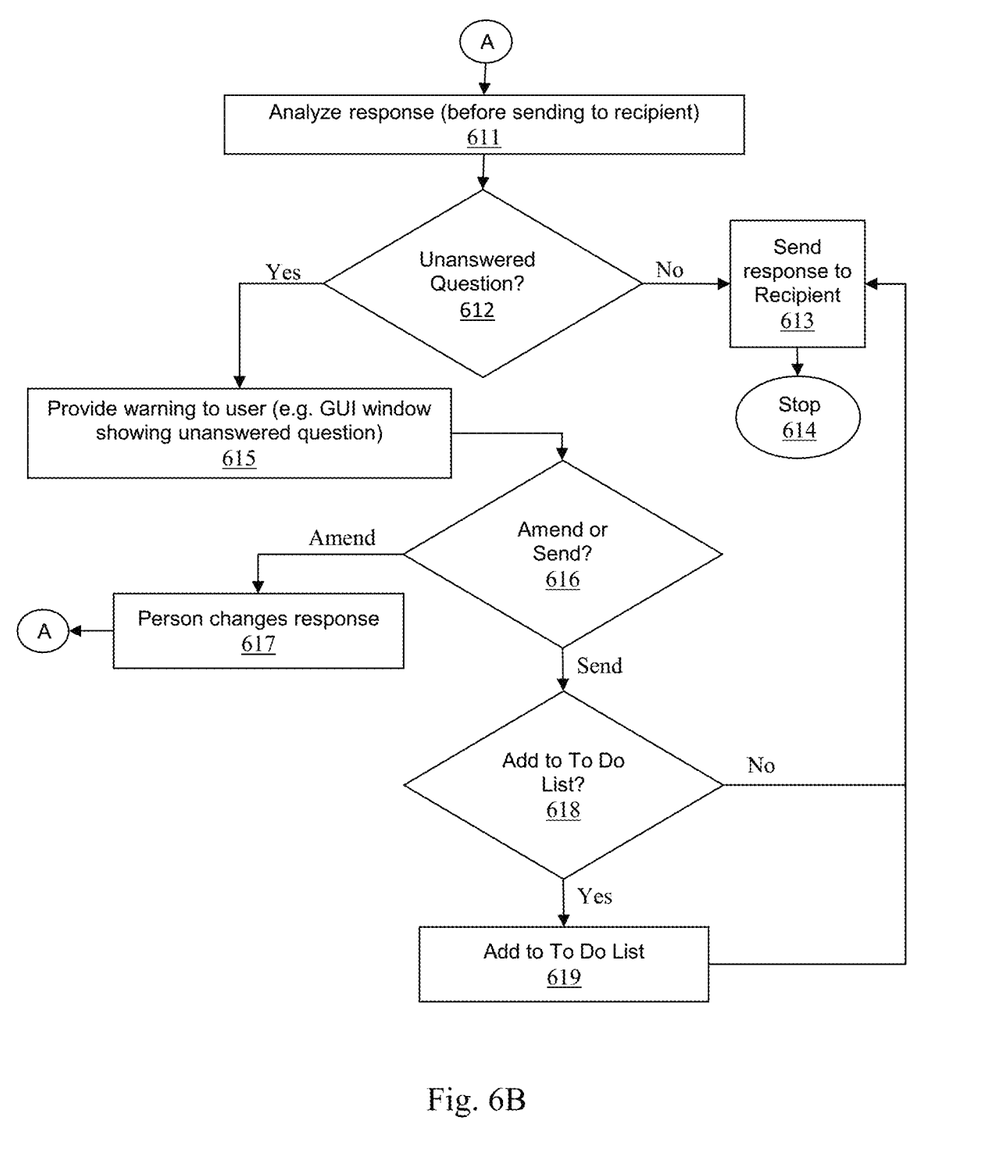

FIGS. 6A and 6B illustrate a high level flow diagram of a message and response being analyzed in accordance with aspects of the embodiments. The process can start 601 with a computer receiving an electronic message intended for a person 602. The message is segmented 603. Entity recognition 604 is used to identify requests (questions and taskings) directed to the person. N, the number of requests for the person, is determined 605. The messaging client, such as an email client, is caused to display "N" in association with the message 606. The message itself is modified by making the requests assigned to the person more visually distinctive 607. A person's desire to respond to the message (e.g. hitting a "reply" button on a GUI) is detected 608. The requests identified at step 604 are listed at the top of a draft response 609. The person edits the draft 610 and, for purposes of this non-limiting example, leaves a question unanswered.

The response is analyzed 611 before being sent to the recipient. If all the questions are answered 612, the response is sent to the recipient 613 and the process stops 614. If a question is unanswered 612 a warning is provided to the user 615 giving the user an option to amend the message or send it to the recipient 618. If the person chooses to amend, then the person changes the response 617 and the process loops back to analyzing the response 611. If the person chooses to send without first amending then the user is given the option to add answering the unanswered question to a to do list 618. If the user so chooses then the task of answering the unanswered question is added to a to do list 619. In either case 618, the message is sent to the recipient 613 before the process stops 614.

Figure 7:
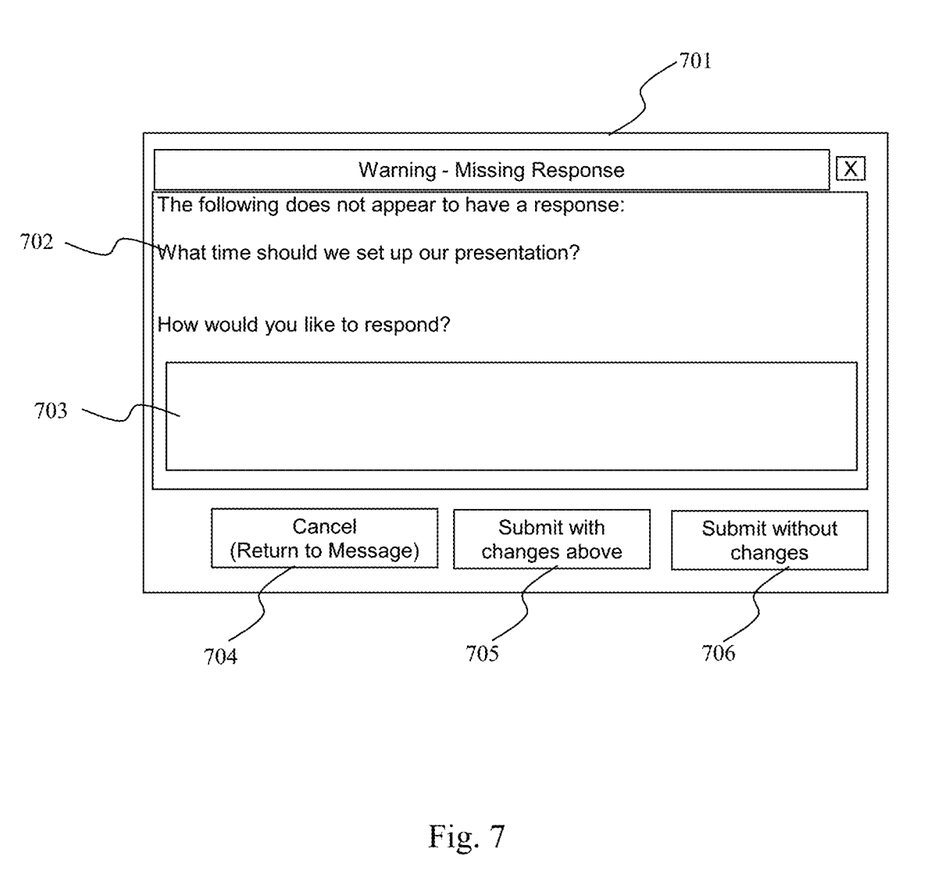
FIG. 7 illustrates a missing response warning in accordance with aspects of the embodiments.

FIG. 7 illustrates a missing response warning 701 in accordance with aspects of the embodiments. The illustrated missing response warning 701 is a GUI window with text, a text box 703, and buttons 704-706. This missing response warning can be shown to a person when the response does not answer a question asked in the message or when the response does not address a task requested in the message. A question directed to the person 702 can be shown and a text box 703 can be provided. The person can enter an answer in the text box 703. By selecting the "submit with changes above" button 705, the person can choose having the answer in the text box 703 automatically incorporated into the response as an answer to the question 702. The person can select the "Cancel (Return to Message)" button 704 to go back to editing the response directly. The person can select the "Submit without changes" button 706 to cause the response to be sent to its recipient without changes.

Figure 8:
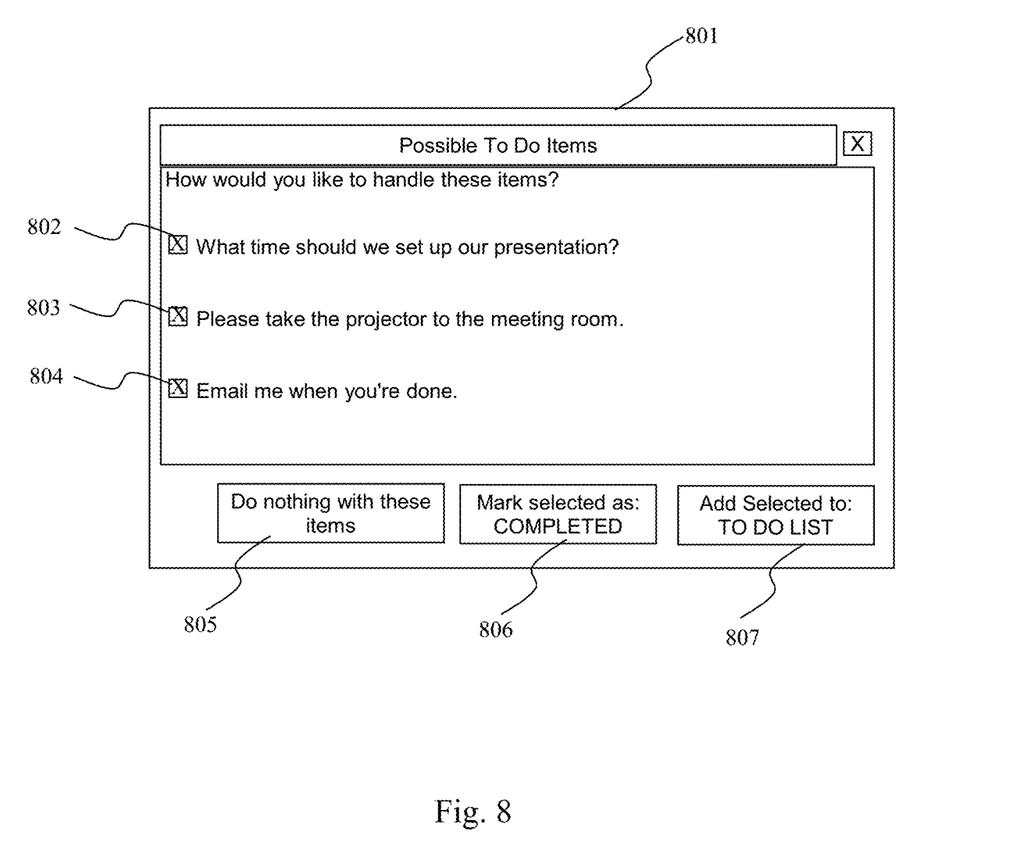
FIG. 8 illustrates a GUI dialog providing an option to add tasks to a to do list in accordance with aspects of the embodiments.

FIG. 8 illustrates a GUI dialog 801 providing an option to add tasks to a to do list in accordance with aspects of the embodiments. As discussed above requests in a message can go unaddressed in a response. Embodiments can identify the unaddressed requests and ask if they should be added to a to do list. The GUI dialog can show the unaddressed requests such as answering question 802 or performing tasks 803, 804. An unaddressed request can be an unanswered question or an unaddressed task. Here, the unaddressed requests 802-804 are illustrated as check boxed items in a list. The GUI dialog presents an option to do nothing 805, a task submission option for submission of selected items (e.g. listed items having checked boxes) for addition to a to do list 807, and a completion option for marking selected items as complete 806. Items can be marked as complete by automatically noting "done" in the response or setting their status to complete in a to do list. The buttons 704-706, 805-807 are user selectable options. The computer, upon detecting selection of a selectable option, performs a programmed task associated with that selectable option.

Figure 9:
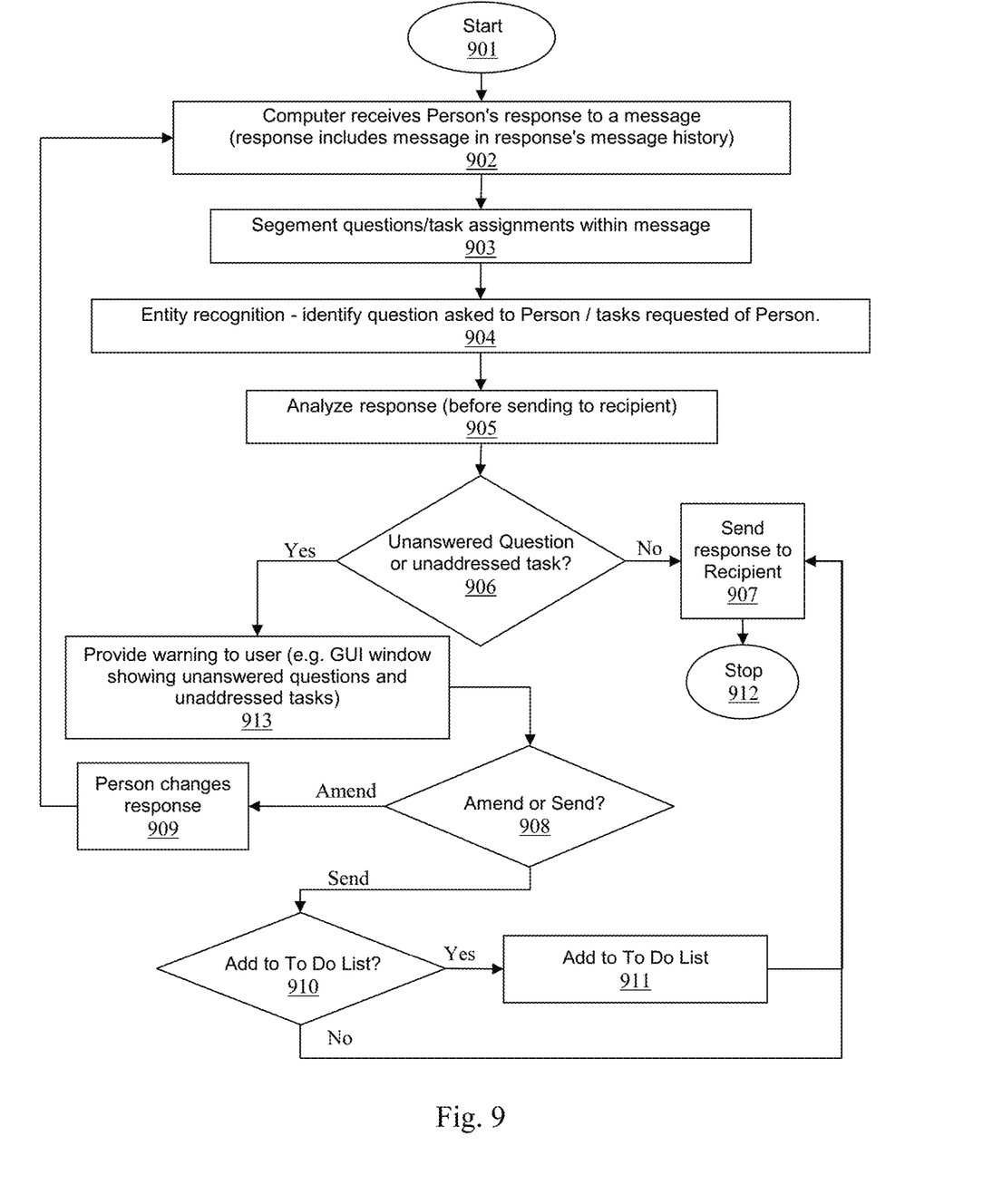
FIG. 9 illustrates a high level flow diagram of a response being analyzed in accordance with aspects of the embodiments.

FIG. 9 illustrates a high level flow diagram of a response being analyzed in accordance with aspects of the embodiments. The process can start 901 when a computer receives a response to a message 902. The response includes a message history that includes the message. For example, email threads often include a full message history of all previous messages. The message can be segmented and analyzed to find questions and task assignments 903. The questions and task assignments can be analyzed to identify those addressed to the person sending the response 904. The response can be analyzed to identify questions that have not been answered and tasks that have not been addressed. For example, a task can be addressed by noting that it is completed, scheduled for completion, placed on a to do list, etc.

If there are no unaddressed requests 906, the response is sent to the recipient 907 before the process stops 912. If there are unaddressed requests 906, the person can receive a warning and given the option to amend the response or send the response to the recipient 913. If the person chooses to amend the response 908, the person can change the response 909 and the process can loop back to the computer obtaining the response 902.

If the person chooses to send the response unchanged 908, then the person can be given an option to add unaddressed requests to a to do list 910. If the person so chooses, unaddressed tasks are added to a to do list 911. Whether items are added to a to do list or not, the response is sent 907 before the process stops 912.

The examples shown here are presented to illustrate aspects of the embodiments and are not intended to be limiting.

It will be appreciated that variations of the above-disclosed and other features and functions, or alternatives thereof, may be desirably combined into many other different systems or applications. Also, it should be understood that various presently unforeseen or unanticipated alternatives, modifications, variations or improvements therein may be subsequently made by those skilled in the art which are also intended to be encompassed by the following claims.

What is claimed is:

1. A processor-based method of communicating in a network, comprising:

receiving, via a communications link, an electronic message comprising a thread including an electronic message history associated with the received electronic message;

automatically performing, via the processor, entity recognition to identify those of the one or more questions that are questions in the thread directed to an entity associated with the inferred task;

identifying and segmenting one or more questions, and one or more tasks from a message body of the received electronic message by automatically processing the received electronic message via a processor through a Natural Language Processing (NLP) pipeline;

identifying one or more inferred tasks from the identified and segmented one or more questions from the received electronic message by automatically processing via the processor the identified and segmented one or more questions by applying inference rules to the identified and segmented questions through the NLP pipeline;

identifying an entity to which the identified and segmented one or more questions, one or more tasks, and one or more inferred tasks are directed to by automatically processing via the processor by applying entity recognition to the identified and segmented one or more questions, one or more tasks, and one or more inferred tasks via the NLP pipeline;

determining a count wherein the count indicates how many of the identified and segmented one or more questions, the one or more tasks, and the one or more inferred tasks are directed to the entity;

causing a messaging client to display the count in association with the message to the identified entity, and causing the messaging client to display and highlight the identified and segmented one or more questions, the one or more tasks, and/or the one or more inferred tasks, if directed at the identified entity reading the message;

identifying one or more unanswered questions, or one or more unaddressed tasks by analyzing a response message submitted by the identified entity as a response to the received message, in order to determine if any of the identified and segmented one or more questions is unanswered, or if the one or more tasks, or the one or more inferred tasks, are unaddressed, and automatically generating a selectable option to add the one or more unanswered question or one or more unaddressed tasks to a to-do list;

detecting selection of the selectable option to add the one or more unanswered question or one or more unaddressed tasks to the to-do list; and causing the one or more unanswered question or one or more unaddressed tasks to be added to the to-do list.

2. The processor-based method of claim 1 further comprising modifying the received electronic message by making the identified and segmented one or more questions directed to the entity to be visually distinctive.

3. The processor-based method of claim 2 further comprising:
detecting the response message to the received electronic message using a draft that is automatically generated; and
providing the draft to the entity, wherein the draft lists the identified and segmented one or more questions directed to the entity.

4. The processor-based method of claim 3 further comprising:

processing the response message before it is sent to a recipient;
in response to determining that one of the identified and segmented one or more questions is an unanswered question;
generating a warning showing the unanswered question; and
providing the entity an opportunity to change the response message before it is sent to the recipient.

5. The processor-based method of claim 4 further comprising:
providing the entity an option to send the response message without changes.

6. The processor-based method of claim 4 wherein the warning is a GUI window, wherein the opportunity to change the response message is provided by a text box and a button provided by the warning, and wherein selecting the button causes text entered in the text box to be added to the response message.

7. A non-transitory computer readable storage medium, storing computer executable instructions, when executed by a processor, cause the processor to:
receiving, via a communications link, an electronic message comprising a thread including an electronic message history associated with the received electronic message;

identifying and segmenting one or more questions, and one or more tasks from a message body of the received electronic message by automatically processing the received electronic message via a processor through a Natural Language Processing (NLP) pipeline;

identifying one or more inferred tasks from the identified and segmented one or more questions from the received electronic message by automatically processing via the processor the identified and segmented one or more questions by applying inference rules to the identified and segmented questions through the NLP pipeline;

identifying an entity to which the identified and segmented one or more questions, one or more tasks, and one or more inferred tasks are directed to by automatically processing via the processor by applying entity recognition to the identified and segmented one or more questions, one or more tasks, and one or more inferred tasks via the NLP pipeline;

determining a count wherein the count indicates how many of the identified and segmented one or more questions, the one or more tasks, and the one or more inferred tasks are directed to the entity;

causing a messaging client to display the count in association with the received electronic message to the identified entity, and causing the messaging client to display and highlight the identified and segmented one or more questions, the one or more tasks, and the one or more inferred tasks, if directed at the identified entity reading the received electronic message;

identifying one or more unanswered questions, or one or more unaddressed tasks by analyzing a response message submitted by the identified entity as a response to the received message, in order to determine if any of the identified and segmented one or more questions is unanswered, or if the one or more tasks, or the one or more inferred tasks, are unaddressed, and automatically generating a selectable option to add the one or more unanswered question or one or more unaddressed tasks to a to-do list;

detecting selection of the selectable option to add the one or more unanswered question or one or more unaddressed tasks to the to-do list; and causing the one or more unanswered question or one or more unaddressed tasks to be added to the to-do list.

8. The non-transitory computer readable storage medium of claim 7 further comprising:

putting the identified and segmented one or more questions, the one or more tasks, and the one or more inferred tasks directed to the entity into a request list; and adding the request list to the received electronic message body.

9. The non-transitory computer readable storage medium of claim 7 further comprising:

obtaining the response message to the received electronic message, the response message addressed to a recipient;

in response to determining that one of the identified and segmented one or more questions is the one or more unanswered questions; and providing the entity with an option to answer the one or more unanswered questions before sending the response message to the recipient.

10. The non-transitory computer readable storage medium of claim 7 further comprising:

providing the entity with a task submission option configured to submit the one or more tasks or one or more inferred tasks as a task request to a task tracking application.

11. The non-transitory computer readable storage medium of claim 10 further comprising: wherein the task submission option is presented within a GUI dialog.

12. The non-transitory computer readable storage medium of claim 7 further comprising:

putting the identified and segmented one or more questions directed to the entity into a request list as a task request; and adding the request list to the message body wherein the task request is selectable, submitting the task request to a task tracking application upon detecting selection of the task request.

13. The non-transitory computer readable storage medium of claim 7 wherein the identified and segmented one or more questions to be answered by the entity is among one or more requests directed to the entity, further comprising:

modifying the received electronic message by making the identified and segmented one or more questions to be answered selectable; and causing the identified and segmented one or more questions to be answered to be submitted to a search engine upon detecting selection of the identified and segmented one or more questions to be answered.

14. The non-transitory computer readable storage medium of claim 7 further comprising:

causing the messaging client to display a selectable indicator in association with the received electronic message wherein the selectable indicator is configured for, when selected, triggering displaying of the identified and segmented one or more questions, the one or more tasks, and the one or more inferred tasks directed to the entity.

15. The non-transitory computer readable storage medium of claim 7 further comprising:

modifying the received electronic message by underlining the identified and segmented one or more questions, the one or more tasks, and the one or more inferred tasks directed to the entity.

16. A computing device, comprising a processor and a memory, wherein the memory includes programmed instructions that, when executed by the processor, cause the computing device to:

receive, via a communications link, an electronic message comprising a thread including an electronic message history associated with the received electronic message;

identify and segment one or more questions, and one or more tasks from a message body of the received electronic message by automatically processing the received electronic message via a processor through a Natural Language Processing (NLP) pipeline;

identify one or more inferred tasks from the identified and segmented one or more questions from the received electronic message by automatically processing via the processor the identified and segmented one or more questions by applying inference rules to the identified and segmented questions through the NLP pipeline;

identify an entity to which the identified and segmented one or more questions, one or more tasks, and one or more inferred tasks are directed to by automatically processing via the processor by applying entity recognition to the identified and segmented one or more questions, one or more tasks, and one or more inferred tasks via the NLP pipeline;

determine a count wherein the count indicates how many of the identified and segmented one or more questions, the one or more tasks, and the one or more inferred tasks are directed to the entity;

cause a messaging client to display the count in association with the received electronic message to the identified entity, and causing the messaging client to display and highlight the identified and segmented one or more questions, the one or more tasks, and the one or more inferred tasks, if directed at the identified entity reading the received electronic message;

identify one or more unanswered questions, or one or more unaddressed tasks by analyzing a response message submitted by the identified entity as a response to the received message, in order to determine if any of the identified and segmented one or more questions is unanswered, or if the one or more tasks, or the one or more inferred tasks, are unaddressed, and automatically generating a selectable option to add the one or more unanswered question or the one or more unaddressed tasks to a to-do list;

detect selection of the selectable option to add the one or more unanswered question or the one or more unaddressed tasks to the to-do list; and cause the one or more unanswered question or one or more unaddressed tasks to be added to the to-do list.

* * * * *